(12) United States Patent
Monticone et al.

(10) Patent No.: US 11,526,686 B1
(45) Date of Patent: Dec. 13, 2022

(54) PROGRAMMABLE CUSTOMIZATION OF A USER INTERFACE OF AN ELECTRONIC EQUIPMENT

(71) Applicant: JT INTERNATIONAL SA, Geneva (CH)

(72) Inventors: Pier Paolo Monticone, Le Grand-Saconnex (CH); Layth Sliman Bouchuiguir, Bellevue (CH)

(73) Assignee: JT INTERNATIONAL SA, Geneva (CH)

( * ) Notice: Subject to any disclaimer, the term of this patent is extended or adjusted under 35 U.S.C. 154(b) by 0 days.

(21) Appl. No.: 17/690,370

(22) Filed: Mar. 9, 2022

(51) Int. Cl.
*G06K 9/62* (2022.01)
*A24F 40/50* (2020.01)
*A24F 40/60* (2020.01)
*G06N 3/08* (2006.01)

(52) U.S. Cl.
CPC ............ *G06K 9/6217* (2013.01); *A24F 40/50* (2020.01); *A24F 40/60* (2020.01); *G06K 9/62* (2013.01); *G06K 9/6256* (2013.01); *G06N 3/08* (2013.01)

(58) Field of Classification Search
CPC .................................. G06F 3/01; A24F 47/00
See application file for complete search history.

(56) References Cited

U.S. PATENT DOCUMENTS 9,015,093 B1 * 4/2015 Commons ............. B60W 30/00
706/26
2020/0000143 A1 * 1/2020 Anderson ............... G06F 21/32

* cited by examiner

*Primary Examiner* — Ross Varndell
(74) *Attorney, Agent, or Firm* — Chip Law Group

(57) ABSTRACT

Provided is an electronic equipment offering a plurality of controllable functionalities and that receives information designating a functionality selected amongst this plurality of controllable functionalities. The electronic equipment also receives a plurality of recordings of a same group of at least one user input for this selected functionality. The electronic equipment also applies a trained neural network model on this received plurality of recordings to recognize an input pattern. The electronic equipment also associates this recognized input pattern with this selected functionality, and stores this association in a memory. The electronic equipment also controls this selected functionality based on this stored association.

17 Claims, 5 Drawing Sheets

PROGRAMMABLE CUSTOMIZATION OF A USER INTERFACE OF AN ELECTRONIC EQUIPMENT

FIELD

The present disclosure relates generally to electronic equipments offering a plurality of controllable functionalities, and more to the customization of the user interface of such electronic equipments.

BACKGROUND

Some electronic equipments offer a plurality of functionalities that are each controllable by means of an input pattern comprising at least one user input. This is notably the case of vaping devices or so-called electronic nicotine delivery systems (also known by the acronym "ENDS") producing an aerosol by heating an aerosol-forming substance mixed with air during a user vaping session.

Generally, the input pattern associated to a functionality of an electronic equipment is a default input pattern set by a manufacturer of this electronic equipment. Therefore, when the user of this electronic equipment wants to use this functionality, he has to reproduce the associated default input pattern with his electronic equipment or with an external device coupled to, and capable of remotely controlling, his electronic equipment. So, there is no possibility for the user to customize the input patterns associated respectively to the functionalities of his electronic equipment, and any other user knowing the default input patterns of an electronic equipment may use the latter.

It has been proposed, notably in the patent document US 10,500,600 B2, to use customized input patterns to control functionalities of an electronic equipment. But these customized input patterns are chosen by a user amongst a list of possible input patterns, which is limiting and frequently induces a recognition error when the user does not reproduce exactly the input pattern associated to a desired functionality because he has not conceived this input pattern himself.

Accordingly, it would be beneficial to improve the situation to decrease the number of input pattern recognition errors.

SUMMARY

An electronic equipment, a device and a server for customizing a user interface based on recognition of input patterns associated to functionalities from recordings of group of user input(s), are provided substantially as shown in, and/or described in connection with, at least one of the figures, as set forth in the appended claims.

The features, functions and advantages that have been discussed above and are described below in details can be achieved independently in various examples or may be combined in other examples. Further details of the examples can be seen with references to the following description and drawings.

BRIEF DESCRIPTION OF THE FIGURES

The illustrative examples, however, as well as preferred modes of use, further objectives and descriptions thereof, will be better understood upon reading the following detailed description, which is given solely by way of non-limiting examples and which is made with reference to the appended drawings, wherein.

DETAILED DESCRIPTION

The present description is directed to an electronic equipment 1, a device 2 and a server 3 for customizing a user interface based on recognition of input patterns, associated to functionalities offered by this electronic equipment 1, from recordings of a group or groups of user input(s).

In the following description any type of user input is concerned, and notably gesture, squeeze, tap, tilt, rotation, movement, sound or word(s), for instance.

In the following description it will be considered that the electronic equipment 1 is a vaping device, such as an electronic cigarette for generating an inhalable vapor from a liquid substrate or a heat-not-burn device for generating an inhalable vapor from heating a plant-based substrate, in particular tobacco, without combustion and pyrolysis thereof . . . But the electronic equipment 1 could be of another type, as long as it may be used and carried by a user and offers at least one controllable functionality.

Moreover, in the following description it will be considered that the (user) device 2 is any connected electronic communication device, i.e. any electronic device comprising a communication interface allowing wireless communications with another electronic device using any known wireless communication protocol, in particular any of WiFi (IEEE 802.11), Bluetooth® (IEEE 801.15.1), Zigbee (IEEE 802.15.4), LoRaWan or Sigfox protocols. So, for instance, the user device 2 could be any of a smartphone, an electronic tablet, a laptop or else a smartwatch.

Figure 1:
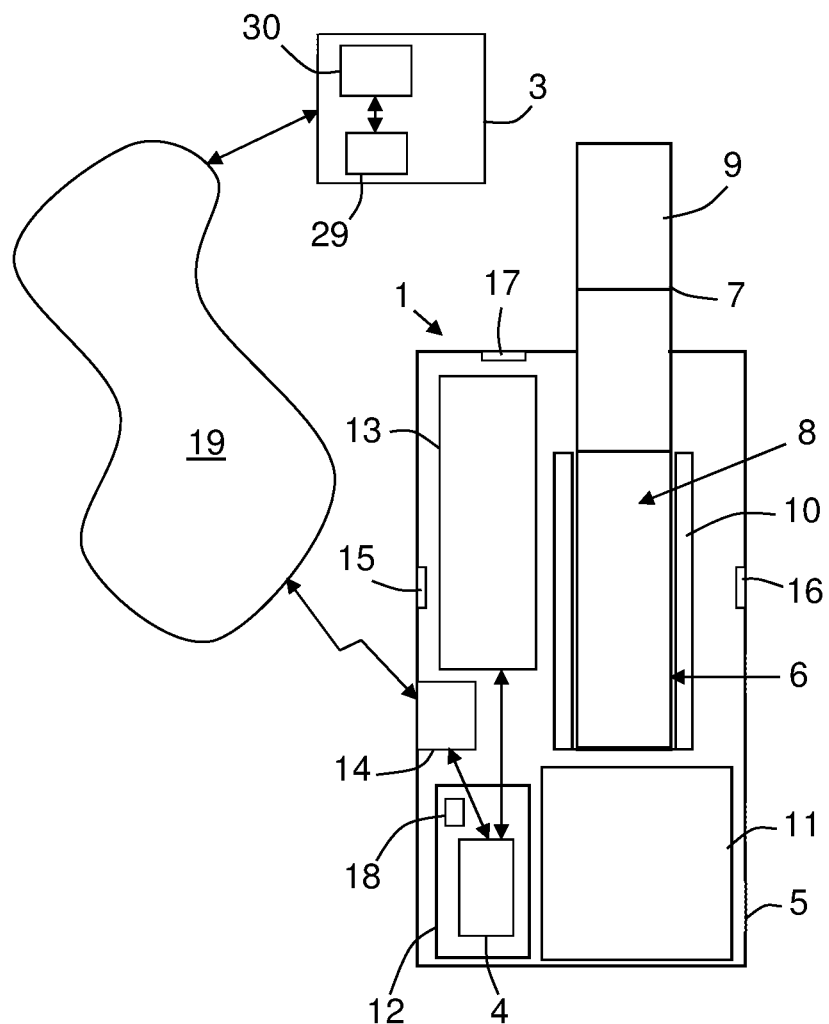
FIG.1 is a diagram that illustrates an example of electronic equipment according to an embodiment of the disclosure coupled to a server according to another embodiment of the disclosure.

An example of electronic equipment 1 according to an embodiment of the invention is illustrated in FIG. 1. In this example of embodiment, the electronic equipment 1 is a heat-not-burn device. But such an electronic equipment 1, that is a vaping device, could be also a liquid vaporization device.

As illustrated in FIG. 1, an electronic equipment 1 according to the invention offers at least one controllable functionality and comprises at least a first circuitry 4 and a group of elements allowing generation of an aerosol by heating an aerosol-forming substance mixed with air during a vaping session of its user.

For instance, each controllable functionality may comprise any of a locking/unlocking of the electronic equipment 1, a start of use of the electronic equipment 1, a stop of use of the electronic equipment 1, a communication of the electronic equipment 1 with an external device 2 or 3, a control of a heating element 10 of the electronic equipment 1, an opening/closing of a shutter controlling access to an internal chamber 6 of the electronic equipment 1, and a cleaning of this heating element 10.

The above-mentioned group of elements of the electronic equipment 1 is housed in an external casing 5 comprising the internal chamber 6 in which a consumable 7 comprising the aerosol-forming substance 8 can be introduced. For instance, this consumable 7 may be a tobacco stick. In this case the aerosol-forming substance 8 comprises tobacco and/or reconstituted tobacco material. For instance, the substance comprises homogenized tobacco material (i.e. reconstituted tobacco such as cast sheet, tobacco paper or laminated tobacco sheet) and one or more of tobacco lamina, cellulose fibre or flavor. But the invention is not limited to this type of consumable 7. Also as illustrated, the consumable 7 may comprise a filter 9 attached at an end of the aerosol-forming substance 8. In the non-limiting example of FIG. 1, the consumable 7 is partly inserted into the internal chamber 6. However, in an embodiment, it could be fully inserted in the internal chamber 6.

The aerosol-forming substance 8 is heated by the heating element (or heater) 10 that is supplied with electrical energy from a power source 11. In the non-limiting example illustrated in FIG. 1 the heating element 10 surrounds the internal chamber 6, and therefore a part of the consumable 7 (and more precisely its aerosol-forming substance 8) to heat the latter. For instance, the heating element 10 may be a thin film heater wrapped around the outer surface of the internal chamber 6 to heat its side walls and at least a part of its internal volume (which therefore defines a heating chamber). But in a non-illustrated embodiment, the heating element 10 could be a coil associated to a susceptor or a resistive coil heater. In other non-illustrated embodiments, the heating element 10 could be located inside the consumable 7 or inside the internal chamber 6.

The electrical energy supplied to the heating element 10 during a vaping session is controlled by the first circuitry 4, that may be provided onto a printed circuit board (or PCB) 12 (here housed into the external casing 5).

The first circuitry 4 comprises at least a processor and a memory arranged for performing operations. For instance, the processor may be a digital signal processor (or DSP), or an application specific integrated circuit (ASIC), or else a field programmable gate array (FPGA). More generally, the processor may comprise integrated (or printed) circuits, or several integrated (or printed) circuits connected therebetween through wired or wireless connections. The term "integrated (or printed) circuits" refers here to any type of device capable of carrying out at least one electric or electronic operation. Also, for instance, the memory may be a random access memory (RAM). But it may be any type of device arranged for storing program instructions for the associated processor.

In general, the functions of the first circuitry 4 may be carried out through the operation of program logic, through dedicated logic, through the interaction of program control and dedicated logic, or even partially manually (by a user). These functions may be provided through the use of dedicated hardware as well as hardware capable of executing software in association with appropriate software.

The first circuitry 4 may also comprise, in addition with its processor(s) and memory(ies), an input interface, a mass memory (notably for storing intermediate data produced during its calculus and processing), and an output interface for delivering messages and instructions.

Figure 2:
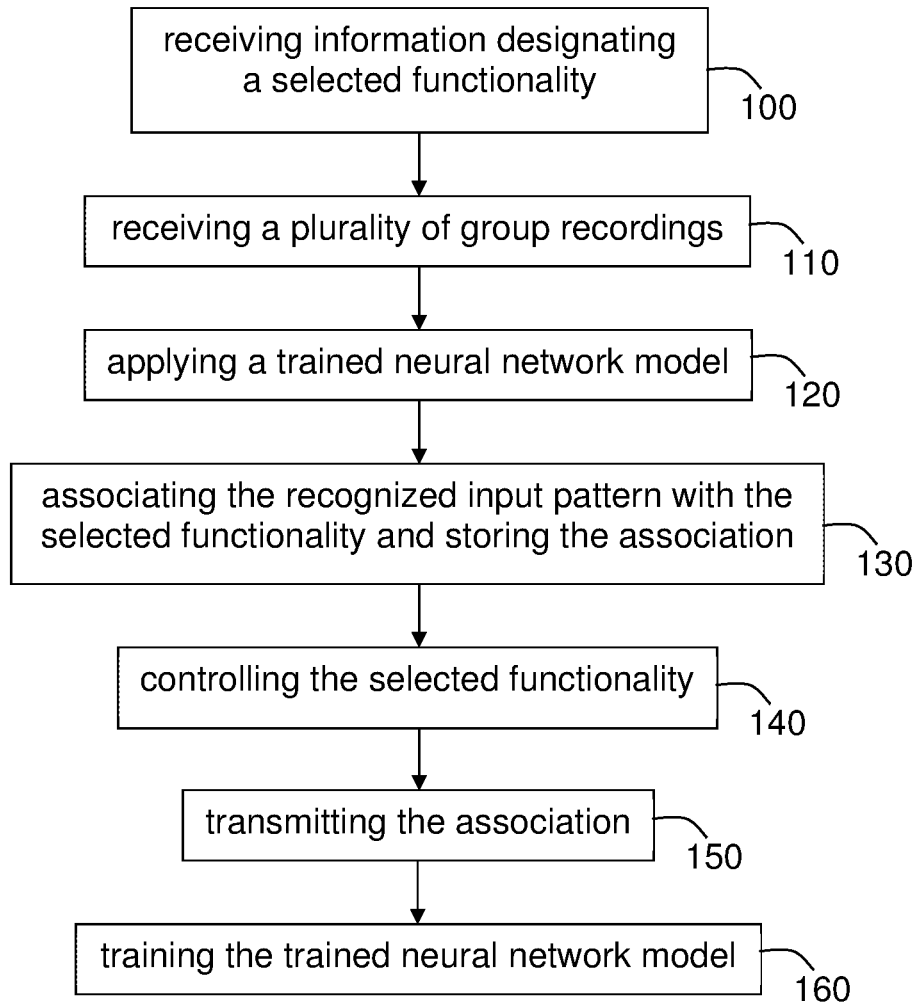
FIG.2 is a diagram that illustrates an example of algorithm that may be implemented by an electronic equipment according to an embodiment of the disclosure.

As illustrated in FIG. 2, the first circuitry 4 is configured to carry out at least five operations 100-140.

The first operation 100 consists in receiving information designating a functionality of the electronic equipment 1 that is selected amongst its plurality of controllable functionalities.

The functionality may be selected via a dedicated application running on the electronic equipment 1, and more precisely on its first circuitry 4, and controllable by the user by means of a user interface 13 connected to the first circuitry 4.

In a non-illustrated embodiment, the dedicated application could run on the user device 2 (here a smartphone) that is used by the user of the electronic equipment 1 and paired to the latter. In this embodiment, the user selects the functionality via the dedicated application running on his user device 2 and the latter transmits the information designating the selected functionality to the electronic equipment 1. So, in this embodiment the electronic equipment 1 may comprise a communication interface 14 coupled to its first circuitry 4 and that allows communications with the paired user device 2. The transmission of this information may be carried out by means of a short-range wireless communication, for instance. Such a short-range wireless communication may be a Bluetooth communication, for instance. But this is a non-limiting example, and other types of short-range wireless communications are possible, and notably NFC, RFID, ZigBee, and Wi-Fi Direct. It could be also possible to couple the user device 2 with the electronic equipment 1 by means of a cable, such as a USB type cable.

The second operation 110 carried out by the first circuitry 4 consists in receiving a plurality of recordings of a same group of at least one user input for the selected functionality.

Each recording of a group of at least one user input may be carried out by at least one sensor via the above-mentioned dedicated application. For instance, the electronic equipment 1 may comprise each sensor 15-18, and in this embodiment each recording starts when the user handles his electronic equipment 1 and carries out a user input that is recorded by at least one sensor 15-18. It should be recognized that the disclosure is not limited in this regard, and each sensor be provided in an external device communicatively coupled (or intended to be coupled) to the electronic equipment 1. Such an external device may be the user device 2 or another device used by the user (for instance a virtual assistant). In this embodiment, each recording starts when the user handles or uses his external device and carries out a user input that is recorded by at least one sensor.

For instance, when the electronic equipment 1 comprises the sensor(s) 15-18, a user input may be a user action on the electronic equipment 1, a user gesture associated with the electronic equipment 1, a sequence of user actions on the electronic equipment 1, and a sequence of user gestures associated with the electronic equipment 1. As mentioned above, any type of user input is concerned, and notably gesture, squeeze, tap, shake, tilt, rotation, movement, sound or word(s), for instance. So, a sensor 15-18 may be an accelerometer, a gyroscope, a pendulum, a strain gauge, button(s), a touch screen, or a microphone, for instance.

In an exemplary embodiment, when the electronic equipment 1 comprises two strain gauges 15 and 16 arranged on two opposite faces of its external casing 5, a user action may consist in simultaneous squeezes on these opposite faces. In another embodiment, when the electronic equipment 1 comprises an accelerometer 17 arranged on another face of its external casing 5, a user action may consist in tapping at least one time on this other face. In still another embodiment, when the electronic equipment 1 comprises at least one strain gauge 15, 16 and an accelerometer 17 a user action may consist in squeezing and tapping.

It should be understood that a same group of user inputs needs to be carried out at least two consecutive times by the same user and recorded by the sensor(s) 15-18 in order to have a sufficient number of recordings of this group.

The first circuitry 4 of the electronic equipment 1 may be configured to control the sensor(s) 15-18 to capture the plurality of recordings of each group of user inputs.

When the recordings are only captured but not processed by the first circuitry 4 of the electronic equipment 1, the data defining them are transmitted by the communication interface 14 of the electronic equipment 1 to the user device 2.

When the recordings are captured and processed by the first circuitry 4, the third operation 120 carried out by this first circuitry 4 consists in applying a trained neural network model on the received plurality of recordings to recognize an input pattern. This means that the neural network model has been previously supervisedly trained to be capable of determining (or recognizing) an input pattern based on a plurality of recordings of a same group of user inputs. The higher the number of recordings, the easier it will be to determine (or recognize) an input pattern for the trained neural network model.

When the recordings are captured and processed by the first circuitry 4, the fourth operation 130 carried out by this first circuitry 4 consists in associating the recognized input pattern with the selected functionality, and in storing this association in a memory.

When the recordings are captured and processed by the first circuitry 4, the fifth operation 140 carried out by this first circuitry 4 consists in controlling the selected functionality based on the stored association.

In other words, when the user carries out user inputs, the latter are recorded by the sensor(s) 15-18 and this recording is compared to the recognized input pattern(s) stored in the association(s), and if this recording matches with a recognized input pattern then the first circuitry 4 controls the selected functionality associated with this recognized input pattern.

So, the invention allows a user to programmably customize the user interface 13 of his electronic equipment 1, and since each recognized input pattern is based on several group recordings the input pattern recognition task is facilitated, and therefore the number of input pattern recognition errors is notably decreased.

For instance, in an embodiment, during the third operation 120 the first circuitry 4 may be further configured to generate a distribution of at least one user input of an input pattern based on the plurality of recordings, and to determine a variability of each user input of this input pattern based on this generated distribution. Each user input variability is then associated with the concerned user input before recognition of a potential input pattern and then may be used for deciding whether or not an input pattern is effectively recognized and then stored or not with the concerned selected functionality as an association in the concerned memory of the first circuitry 4.

In the last embodiment, the first circuitry 4 may be configured to recognize an input pattern as such when each determined variability of the corresponding user input(s) is smaller than a first threshold value. This allows to reject user inputs of recordings having an associated determined variability greater than the first threshold value, and in this situation there is no recognized input pattern based on these recordings.

In the last embodiment, the first circuitry 4 may be configured to set an input pattern as a password for authentication of a user of the electronic equipment 1 when the determined variability is smaller than a second threshold value (possibly equal to the first threshold value), and to associate this user with this input pattern.

In the last embodiment, the first circuitry 4 may be configured to request for additional recordings of user input(s) for a potential input pattern when the determined variability associated with at least one user input of previously received recordings is larger than a third threshold value (possibly equal to the first threshold value). This option is intended to improve the definition of a recognized input pattern, and therefore to facilitate recognition of the coming input patterns provided by the user.

The request may be provided to the user by the electronic equipment 1 (by means of its user interface 13), or by an external device communicatively coupled to the electronic equipment 1 (for instance the user device 2 or a virtual assistant). For instance, such a request may be a message displayed on a screen of a user interface (13) and/or broadcasted by a loudspeaker.

In an exemplary embodiment, the first circuitry 4 may be configured to receive another (or second) plurality of recordings for a selected functionality to which a (first) recognized input pattern has been already associated with. In this embodiment, the first circuitry 4 is also configured to apply the trained neural network model on this other (or second) received plurality of recordings to recognize another (or second) input pattern, then to associate these first and second recognized input patterns with this selected functionality, and then to control this selected functionality based on the first or second recognized input pattern. So, the first circuitry 4 carries out one more time each one of the five operations 100-140. In other words, the invention allows a same selected functionality to be associated with at least two different recognized input patterns, possibly, but not necessarily, associated with different users of the same electronic equipment 1.

In an embodiment, the first circuitry 4 may be configured to update an association of a selected functionality with a default input pattern with a recognized input pattern. This option allows the user of an electronic equipment 1 (offering a functionality associated with a default input pattern) to replace this default input pattern with a customized input pattern. This recognized input pattern may be obtained by the first circuitry 4 by reproducing the first 100 to fourth 130 operations with new recordings of a same group of user input(s), or by receiving a message originating from an external device communicatively coupled to the electronic equipment 1 (for instance the user device 2 or a virtual assistant).

In an embodiment, the first circuitry 4 may be configured to execute an input pattern recognition process on a user input of an input pattern subsequent to its association with a selected functionality, and to control execution of this selected functionality or authentication of a user associated with this input pattern, based on the execution of this pattern recognition process. So, many different custom user inputs may be mapped to (or associated with) the same user device functionality, and therefore different users might be authenticated or the user might use the input that is the most adequate in the current environment or mode. For instance, if the user device 2 is connected with the associated electronic equipment 1, it may rely on electronic equipment input(s), otherwise on input-based only on sensors integrated into the user device 2. This allows to adapt the current configuration to the concerned mode.

In an embodiment, the first circuitry 4 may be configured, during a sixth operation 150, to trigger transmission of information defining an association between a recognized input pattern and a selected functionality to a communication equipment for backup storage of this transmitted information. For instance, this communication equipment may be the server 3. This requires this communication equipment to be accessible via at least one communication network 19 to which the electronic equipment 1 can be coupled via its communication interface 14. This option allows the user to have at his disposal a copy of a recognized input pattern he has customized to reuse it later with another electronic equipment, or to make this recognized input pattern available for other authorized users.

In an embodiment, the first circuitry 4 may be configured to receive a user input of a recognized input pattern during a seventh operation 160 to control the corresponding selected functionality after the latter has been associated with this recognized input pattern, and to train the trained neural network model based on this received user input as a learning input to this trained neural network model. This option allows to un-supervisedly continuously train the trained neural network model during normal use of the electronic equipment 1 (e.g. for mapping the clustering on the classification generated during the supervised training), and therefore to facilitate recognition of the coming input patterns but also recognition of new input patterns based on new pluralities of recordings and to be associated to selected functionalities.

In an embodiment, the first circuitry 4 may be configured to control the trained neural network model during the third operation 120 to determine a complexity level of an input pattern under recognition based on a set of criteria, and to associate this input pattern to the concerned selected functionality when this determined complexity level is greater than a first threshold complexity. In this case, the trained neural network model has been previously trained based on this set of criteria and this first threshold complexity. This option allows to reject an input pattern that is too simple before it is associated to a selected functionality.

For instance, the set of criteria may include at least one of a minimum number of actions/gestures, a maximum number of actions/gestures, a similarity/repetition of the same action/gesture, a difficulty in recognizing a specific action/gesture, and a sequence of actions/gestures.

In the previously described embodiment, the first circuitry 4 may be configured to control the trained neural network model to reject an input pattern under recognition when the determined complexity level is greater than a second threshold complexity that is greater than the first threshold complexity. This option allows to reject an input pattern that is too complex before it is associated to a selected functionality.

Figure 3:
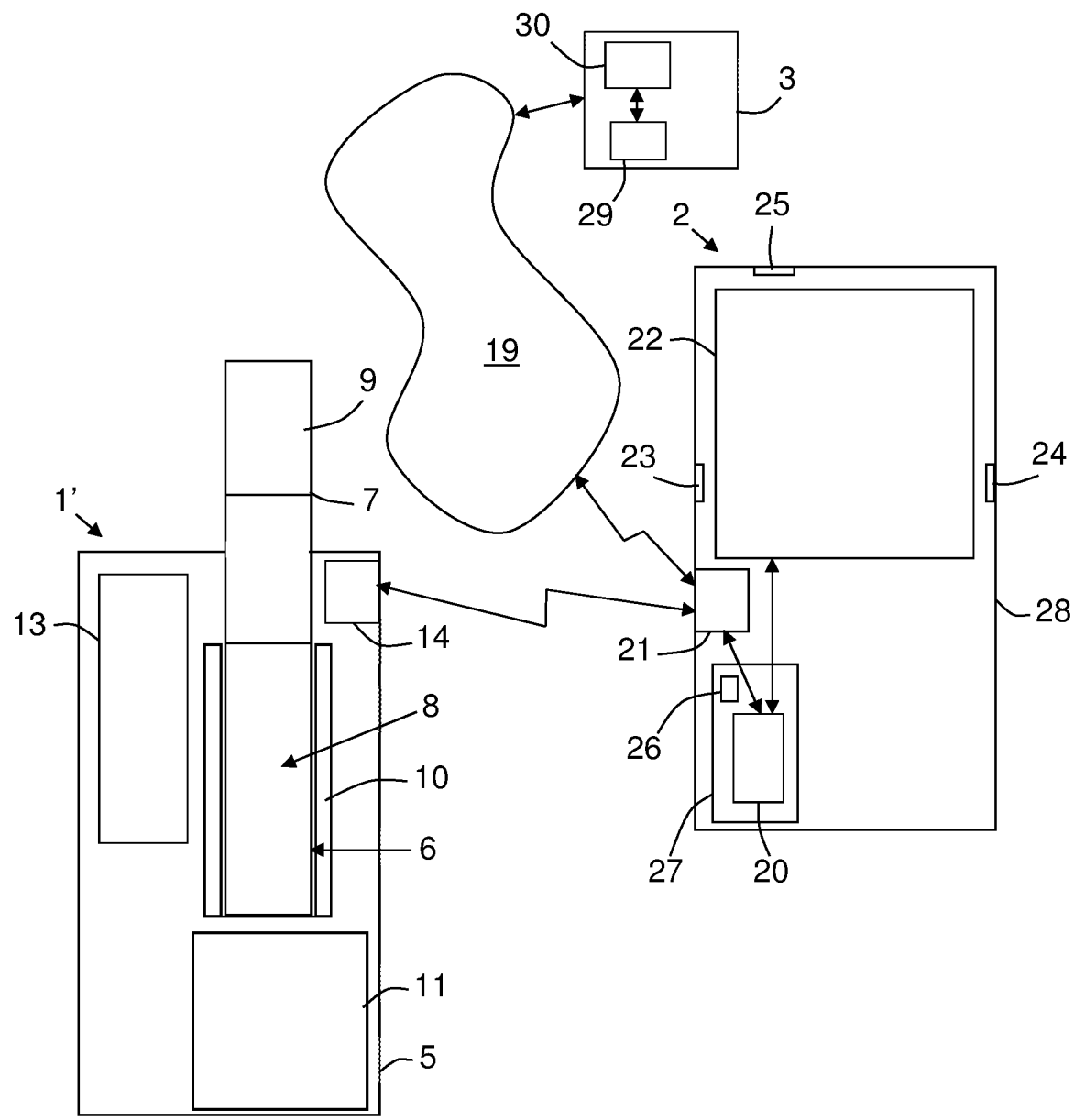
FIG.3 is a diagram that illustrates an example of user device according to another embodiment of the invention, coupled to an electronic equipment and a server according to still another embodiment of the disclosure.

In another embodiment, the user device 2 (here a smartphone) may be in charge, at least partly, of the recognition of the user patterns and of their association to selected functionalities of an electronic equipment 1' that is not capable of such recognitions and associations. In this embodiment, as illustrated in FIG. 3, the user device 2 comprises a second circuitry 20 and a communication interface 21 that is configured to communicate with the communication interface 14 of the electronic equipment 1'. This electronic equipment 1' offers at least one functionality that is remotely controllable by the user device 2, and more precisely by its second circuitry 20.

This second circuitry 20 comprises at least a processor and a memory arranged for performing operations. For instance, the (each) processor may be a digital signal processor (or DSP), or an application specific integrated circuit (ASIC), or else a field programmable gate array (FPGA). More generally, the processor may comprise integrated (or printed) circuits, or several integrated (or printed) circuits connected therebetween through wired or wireless connections. Also, for instance, the memory may be a random access memory (or RAM). But it may be any type of device arranged for storing program instructions for the associated processor.

In general, the functions of the second circuitry 20 may be carried out through the operation of program logic, through dedicated logic, through the interaction of program control and dedicated logic, or even partially manually (by a user). These functions may be provided through the use of dedicated hardware as well as hardware capable of executing software in association with appropriate software.

The second circuitry 20 may also comprise, in addition with its processor(s) and memory(ies), an input interface, a mass memory (notably for storing intermediate data produced during its calculus and processing), and an output interface for delivering messages and instructions.

As illustrated in FIG. 3, the second circuitry 20 may be fixed onto a printed circuit board (or PCB) 27 that is housed into an external casing 28.

Figure 4:
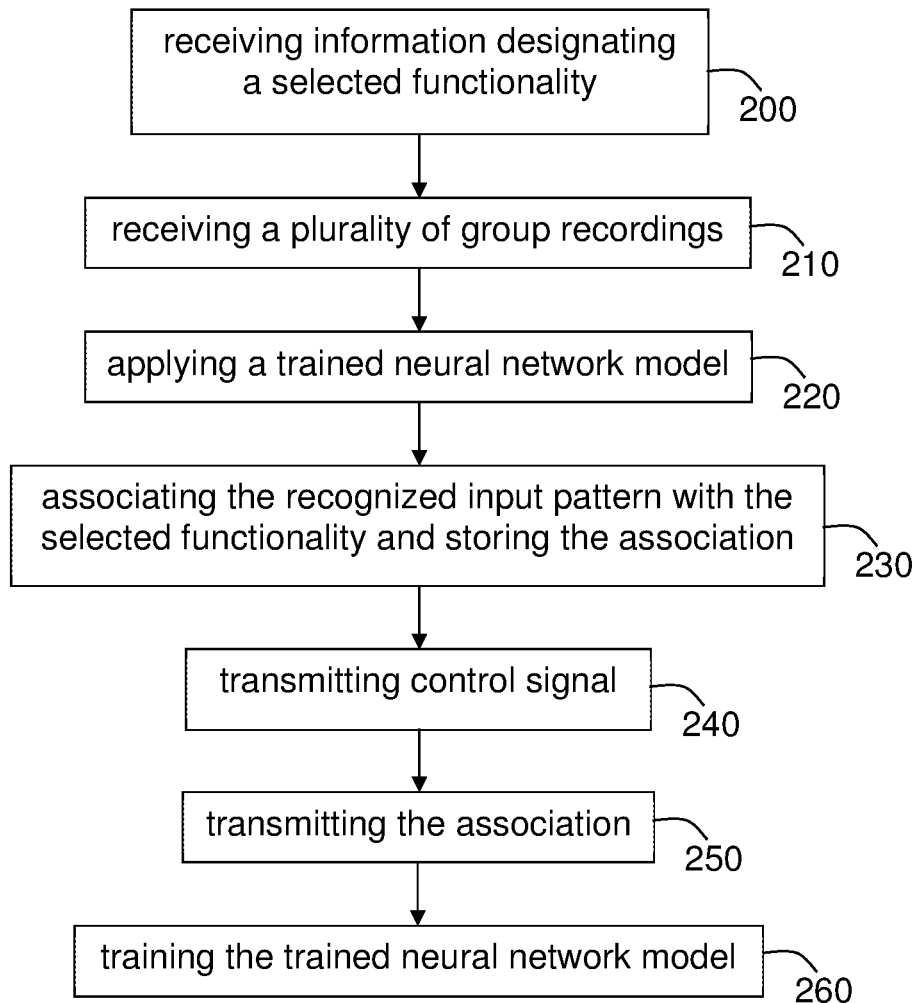
FIG.4 is a diagram that illustrates an example of algorithm that may be implemented by a user device according to an embodiment of the disclosure.

As illustrated in FIG. 4, the second circuitry 20 is configured to carry out at least five operations 200-240.

The first operation 200 consists in receiving information designating a functionality of the controlled electronic equipment 1' that is selected amongst its plurality of controllable functionalities.

The functionality may be selected via a dedicated application running on the user device 2, and more precisely on its second circuitry 20, and controllable by the user by means of a user interface 22 connected to the second circuitry 20.

In a non-illustrated embodiment, the dedicated application could run on the electronic equipment 1' that is used by the user of the user device 2 and paired to the latter. In the embodiment, the user selects the functionality via the dedicated application running on his electronic equipment 1' and the latter transmits the information designating the selected functionality to the paired user device 2, via its communication interface 14. The transmission of this information may be carried out by means of a short-range wireless communication, for instance. Such a short-range wireless communication may be a Bluetooth communication, for instance. But this is a non-limiting example, and other types of short-range wireless communications are possible, and notably NFC, RFID, ZigBee, and Wi-Fi Direct. It could be also possible to couple the user device 2 with the electronic equipment 1' by means of a cable (possibly of the USB type).

The second operation 210 carried out by the second circuitry 20 consists in receiving a plurality of recordings of a same group of at least one user input for the selected functionality.

Each recording of a group of at least one user input may be carried out by at least one sensor via the above-mentioned dedicated application. For instance, the user device 2 may comprise each sensor 23-26, and in this embodiment each recording starts when the user handles his user device 2 and carries out a user input that is recorded by at least one sensor 23-26. It should be recognized that the disclosure is not limited in this regard, and each sensor could be provided in an external device communicatively coupled (or intended to be coupled) to the user device 2. Such an external device may be the electronic equipment 1' or another device used by the user (for instance a virtual assistant). In the embodiment, each recording starts when the user handles or uses his external device and carries out a user input that is recorded by at least one sensor.

The second circuitry 20 of the user device 2 may be configured to control the sensor(s) 23-26 to capture the plurality of recordings of each group of user input(s).

When the recordings are only captured but not processed by the electronic equipment 1', the data defining them are transmitted to the user device 2 by its communication interface 14.

When the recordings are captured and processed by the second circuitry 20, the third operation 220 carried out by this second circuitry 20 consists in applying a trained neural network model on the received plurality of recordings to recognize an input pattern.

When the recordings are captured and processed by the second circuitry 20, the fourth operation 230 carried out by this second circuitry 20 consists in associating the recognized input pattern with the selected functionality, and in storing this association in a memory.

When the recordings are captured and processed by the second circuitry 20, the fifth operation 240 carried out by this second circuitry 20 consists in transmitting a control signal to the controlled electronic equipment 1' to control this selected functionality each time the user provides the associated recognized input pattern to the user device 2.

In other words, when the user carries out user input(s) with his user device 2, these user inputs are recorded by the sensor(s) 23-26 and this recording is compared to the recognized input pattern(s) stored in the association(s), and if this recording matches with a recognized input pattern then the second circuitry 20 transmits a control signal to the controlled electronic equipment 1' to control the selected functionality associated with this recognized input pattern.

So, the invention allows a user to programmably customize a part of the user interface 22 of his user device 2 that allows recognition of a user pattern concerning a controllable functionality of the electronic equipment 1'. Moreover, since each recognized input pattern is based on several group recordings, the input pattern recognition task of the user device 2 is facilitated, and therefore the number of input pattern recognition errors with this user device 2 is notably decreased.

Every option described above and concerning the first circuitry 4 concerns also the second circuitry 20, and notably the ones concerning the third 120, fourth 130, sixth 150 and seventh 160 operations. So, the third operation 220 carried out by the second circuitry 20 is equivalent to the third operation 120 carried out by the first circuitry 4, the fourth operation 230 carried out by the second circuitry 20 is equivalent to the fourth operation 130 carried out by the first circuitry 4, a sixth operation 250 carried out by the second circuitry 20 is equivalent to the sixth operation 150 (transmission of association information to the server 3) carried out by the first circuitry 4, and a seventh operation 260 carried out by the second circuitry 20 is equivalent to the seventh operation 160 (training the trained neural network model based on newly received user input) carried out by the first circuitry 4.

Figure 5:
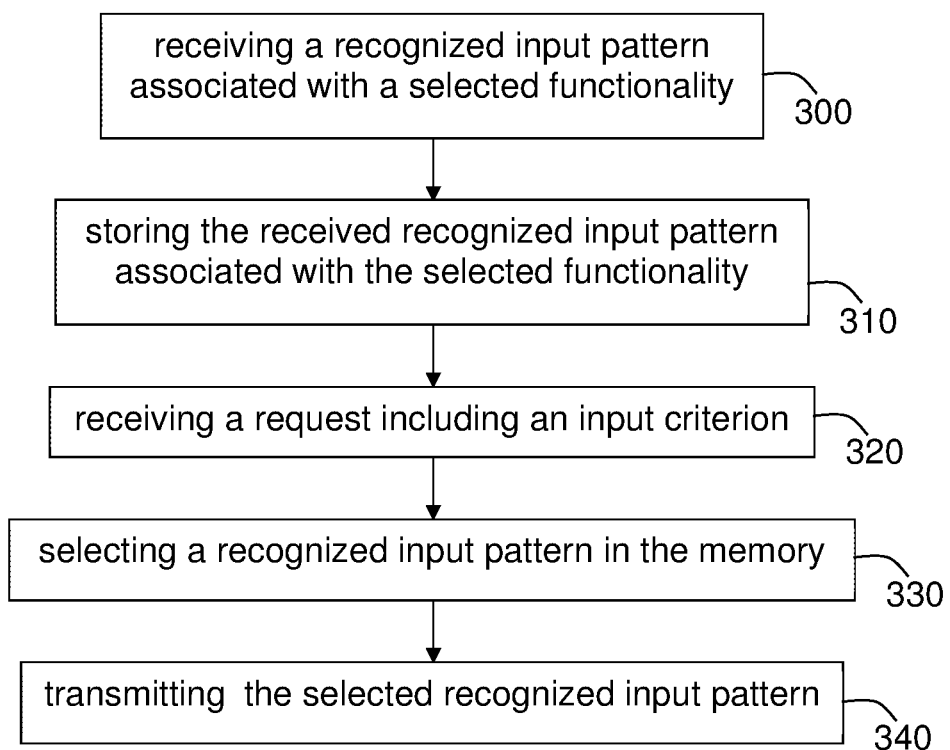
FIG.5 is a diagram that illustrates an example of algorithm that may be implemented by a server according to an embodiment of the disclosure.

In still another embodiment illustrated in FIGS. 1 and 3, the server 3 may comprise a memory 29 and a third circuitry 30. This third circuitry 30 is configured to carry out five operations 300-340 as illustrated in FIG. 5.

The first operation 300 consists in receiving at least one recognized input pattern associated with a functionality of an electronic equipment 1 or 1' offering a plurality of controllable functionalities.

The second operation 310 carried out by the third circuitry 30 consists in storing this received recognized input pattern in association with the electronic equipment functionality in the memory 29.

The third operation 320 carried out by the third circuitry 30 consists in receiving a request including an input criterion from a device different from the concerned electronic equipment 1 or 1'. This device may be another electronic equipment different from the electronic equipment 1, or a user device different from the user device 2 paired with the electronic equipment 1 or 1'.

The fourth operation 330 carried out by the third circuitry 30 consists in selecting a recognized input pattern into the memory 29 based on this received input criterion.

The fifth operation 340 carried out by the third circuitry 30 consists in transmitting this selected recognized input pattern to the requesting device.

For instance, the input criterion may be chosen from a group comprising a selection of a recognized input pattern associated to a functionality of the concerned electronic equipment, a selection of a functionality of the concerned electronic equipment, and a selection of a filter criterion including a complexity level of an input pattern associated to a functionality of the concerned electronic equipment.

The invention claimed is:

1. An electronic equipment, comprising:
   circuitry configured to:
   receive information designating a functionality selected among a plurality of controllable functionalities;
   receive a plurality of first recordings of a same group of at least one user input for said selected functionality;
   generate a distribution of said at least one user input of a first input pattern based on said received plurality of first recordings;
   determine a variability of said at least one user input of said first input pattern in said received plurality of first recordings based on said generated distribution;
   apply a trained neural network model on said received plurality of first recordings to recognize said first input pattern in a case where said determined variability of said at least one user input of said first input pattern is smaller than a threshold value;
   associate said recognized first input pattern with said selected functionality;
   store said association in a memory; and
   control said selected functionality based on said stored association.

2. The electronic equipment according to claim 1, wherein said circuitry is further configured to:
   set said first input pattern as a password for authentication of a user of said electronic equipment in a case where said determined variability is smaller than said threshold value; and
   associate said user with said first input pattern.

3. The electronic equipment according to claim 1, wherein said circuitry is further configured to request for additional recordings of said at least one user input for said first input pattern in case where said determined variability associated with said at least one user input of previously received recordings is larger than said threshold value.

4. The electronic equipment according to claim 1, wherein said circuitry is further configured to:

receive a plurality of second recordings for said selected functionality;
apply said trained neural network model on said received plurality of second recordings to recognize a second input pattern;
associate said recognized first input pattern and said second input pattern with said selected functionality; and
control said selected functionality based on said first input pattern or said second input pattern.

5. The electronic equipment according to claim 1, wherein said circuitry is further configured to update an association of said selected functionality with a default input pattern with said recognized first input pattern.

6. The electronic equipment according to claim 1, wherein said circuitry is further configured to:
execute an input pattern recognition process on a user input of said first input pattern subsequent to said association; and
control one of execution of said selected functionality or authentication of a user associated with said first input pattern, based on said execution of said input pattern recognition process.

7. The electronic equipment according to claim 1, wherein said circuitry is further configured to:
receive a user input of said recognized first input pattern to control said selected functionality after said association of said selected functionality with said recognized first input pattern, and
train said trained neural network model based on said received user input as a learning input to said trained neural network model.

8. The electronic equipment according to claim 1, wherein said first input pattern includes at least one of a user action on said electronic equipment, a user gesture associated with said electronic equipment, a sequence of user actions on said electronic equipment, or a sequence of user gestures associated with said electronic equipment.

9. The electronic equipment according to claim 1, further comprising at least one sensor, wherein said circuitry is further configured to control said at least one sensor to capture said plurality of first recordings of said same group of said at least one user input.

10. The electronic equipment according to claim 1, wherein
said circuitry is further configured to receive said plurality of first recordings of said first input pattern from an external device communicatively coupled with said electronic equipment, and
said electronic equipment further comprises at least one sensor configured to capture said plurality of first recordings.

11. The electronic equipment according to claim 1, wherein each controllable functionality of the plurality of controllable functionalities is chosen from a one of a locking of said electronic equipment, unlocking of said electronic equipment, a start of use of said electronic equipment, a stop of use of said electronic equipment, a communication of said electronic equipment with an external device, a control of a heating element of said electronic equipment, one of an opening or closing of a shutter controlling access to a chamber of said electronic equipment, or a cleaning of said heating element.

12. The electronic equipment according to claim 1, wherein said circuitry is further configured to control said trained neural network model to:
determine a complexity level of said first input pattern under recognition based on a set of criteria, and
associate said first input pattern to said selected functionality in a case where said determined complexity level is greater than a first threshold complexity, said trained neural network model being trained based on said set of criteria and said first threshold complexity.

13. The electronic equipment according to claim 12, wherein said circuitry is further configured to control said trained neural network model to reject said first input pattern in a case where said determined complexity level is greater than a second threshold complexity that is greater than said first threshold complexity.

14. The electronic equipment according to claim 1, wherein said circuitry is further configured to trigger transmission of information defining said association between said recognized first input pattern and said selected functionality to a communication equipment for backup storage of said transmitted information.

15. The electronic equipment according to claim 1, wherein said electronic equipment is one of a vaping device, an aerosol generation device, an electronic cigarette, a tobacco delivery device, or a nicotine delivery device.

16. A device, comprising:
circuitry configured to:
receive information designating a functionality selected among a plurality of controllable functionalities of a controlled electronic equipment;
receive a plurality of recordings of a same group of at least one user input for said selected functionality;
generate a distribution of said at least one user input of an input pattern based on said received plurality of recordings;
determine a variability of said at least one user input of said input pattern in said plurality of recordings based on said generated distribution;
apply a trained neural network model on said received plurality of recordings to recognize said input pattern in a case where said determined variability of said at least one user input of said input pattern is smaller than a threshold value;
associate said recognized input pattern with said selected functionality;
store said association in a memory; and
transmit a control signal to said controlled electronic equipment to control said selected functionality each time said recognized input pattern is input to said device.

17. A server, comprising:
a memory; and
circuitry configured to:
receive at least one recognized input pattern associated with a functionality of a plurality of controllable functionalities of an electronic equipment;
store said received at least one recognized input pattern in association with said functionality of said electronic equipment in said memory;
receive a request including an input criterion from a device different from said electronic equipment, wherein said input criterion comprises at least one of a selection of said recognized input pattern associated to said functionality of said electronic equipment, a selection of said functionality of said electronic equipment, or a selection of a filter criterion including a complexity level of said recognized input pattern associated to said functionality of said electronic equipment;

select a recognized input pattern from said at least one recognized input pattern in said memory based on said input criterion; and transmit said selected recognized input pattern to said device.

\* \* \* \* \*